(12) United States Patent
Takada et al.

(10) Patent No.: US 6,308,499 B1
(45) Date of Patent: Oct. 30, 2001

(54) METHOD FOR MANUFACTURING/HANDLING FLUID COMPONENT PACKAGED GOODS, MANUFACTURE/HANDLING INSTRUCTING DATA CODE FOR USE IN THIS METHOD AND FLUID COMPONENT PACKAGED GOODS AFFIXED BY THIS MANUFACTURE/HANDLING INSTRUCTING DATA CODE

(75) Inventors: Hiromichi Takada, Aichi; Kazuhiko Ide, Gifu, both of (JP)

(73) Assignee: Kikusui Chemical Industries Co., Ltd., Nagoya (JP)

(*) Notice: Subject to any disclaimer, the term of this patent is extended or adjusted under 35 U.S.C. 154(b) by 0 days.

(21) Appl. No.: 09/348,266

(22) Filed: Jul. 7, 1999

(51) Int. Cl.[7] .............................. B65B 61/26; B65B 57/00
(52) U.S. Cl. .................... 53/415; 53/467; 53/55; 53/64; 53/135.2; 53/136.1; 53/282
(58) Field of Search .......................... 53/415, 443, 467, 53/473, 475, 55, 493, 64, 135.2, 136.1, 147, 282

(56) References Cited

U.S. PATENT DOCUMENTS 5,111,855 * 5/1992 Boeck et al. .

FOREIGN PATENT DOCUMENTS

| 41 31 881 | 7/1992 | (DE) . |
|---|---|---|
| 0 176 140 | 4/1986 | (EP) . |
| 0 351 681 | 1/1990 | (EP) . |
| 0 427 497 | 5/1991 | (EP) . |
| 0 612 558 | 8/1994 | (EP) . |
| A-57-71151 | 5/1982 | (JP) . |
| A-59-124469 | 7/1984 | (JP) . |
| A-62-28157 | 2/1987 | (JP) . |
| A-4-146649 | 5/1992 | (JP) . |
| A-6-178955 | 6/1994 | (JP) . |

* cited by examiner

Primary Examiner—Stephen F. Gerrity
(74) Attorney, Agent, or Firm—Oblon, Spivak, McClelland, Maier & Neustadt, P.C.

(57) ABSTRACT

There is provided a method for manufacturing and handling a variety of fluid component packaged goods efficiently. A manufacturing/handling instructing data code containing both manufacturing information of the fluid component and handling information of the fluid component packaged goods is indicated on the package to carry out the whole manufacturing and handling steps from first to last by the data code.

6 Claims, 1 Drawing Sheet

METHOD FOR MANUFACTURING/HANDLING FLUID COMPONENT PACKAGED GOODS, MANUFACTURE/HANDLING INSTRUCTING DATA CODE FOR USE IN THIS METHOD AND FLUID COMPONENT PACKAGED GOODS AFFIXED BY THIS MANUFACTURE/HANDLING INSTRUCTING DATA CODE

BACKGROUND OF THE INVENTION

1. Field of the Invention

The present invention relates to a method for manufacturing/handling fluid component packaged goods, a manufacture/handling instructing data code for use in this method and fluid component packaged goods to which this manufacture/handling instructing data code is affixed. The invention is suitably applied to goods such as a paint can in which paint is filled in particular.

2. Description of the Related Art

A data code such as a bar code and a two-dimensional data code has been introduced into manufacturing lines of various goods as a manufacturing instructing data code to enhance the efficiency for manufacturing goods and to eliminate processing and handling failures during the manufacture.

For instance, JP-A-57-71151, JP-A-62-28157 and JP-A-4-146649 have disclosed such data code in connection with semiconductor devices, JP-A-59-124469 has disclosed it in connection with the production of cars and JP-A-6-178955 has disclosed it in connection with painting products. Further, JP-A-6-134656 and JP-A-7-21271 have disclosed a manufacturing instructing data code itself.

In the technologies disclosed in the above-mentioned publications, the manufacturing instructing data code such as a bar code is affixed to nonprocessed/non-treated goods to process/treat the goods accurately and automatically by reading processing/treatment information directly from the data code or by collating goods identification information read on a manufacturing line with processing/treatment information in a computer.

All of these technologies described above can improve the manufacturing efficiency and reduce processing/treatment failures.

By the way, each of the technologies described above utilizes the data code only in the processing/treatment of goods. However, in general, there is a packaging line after the manufacturing line for the goods of general size manufactured in the factory line, except very large goods such as a car, and the factory line cycle ends after passing through steps of classifying the packaged goods and conveying the packaged goods to predetermined shipping yards. Accordingly, it has been desired to introduce something like a "handling instructing data code" as to handling after the manufacturing process to improve its efficiency and to reduce handling failures.

However, because the packaged goods can be manufactured only after the processing/treatment of the goods, the manufacturing instructing data code cannot be affixed to the package. Even if the handling instructing data code is affixed to the goods, it is difficult to read the code mechanically through the package in general except for a package such as vacuum packing by means of a transparent film. Accordingly, it has only been possible to affix the manufacturing instructing data code to goods to be processed/treated and to affix the handling instructing data code, even if introduced, separately to goods to be packaged. Namely, such method has required two data codes for two objects, i.e. the manufacturing instructing data code for a product and the handling instructing data code for its package, in separate steps for one packaged goods. Further, these two data codes must correspond correctly with the goods and package. Therefore, there have been problems that the data code pasting and data processing in a computer or the like are very complicated.

The same applies to the field of fluid component goods such as paint and various liquid component goods or of solid particulate component goods having fluidity. Namely, it has not been possible to improve the manufacturing, packaging and handling efficiency and to reduce handling failures by using the manufacturing instructing data code and the handling instructing data code.

SUMMARY OF THE INVENTION

Accordingly, it is an object of the invention to eliminate the above-mentioned problems in manufacturing/handing the fluid component packaged goods.

The inventors of the present application have reached the following points to be noticed and conceived the present invention:

(a) Normal solid goods allow the manufacturing instructing data code to be indicated directly on the goods and can be processed/treated according to the manufacturing instructing data code as the goods are conveyed on a manufacture line one by one. However, it has the above-mentioned problems because they cannot be processed/treated from the outside of the package.

(b) Fluid component goods do not allow the manufacturing instructing data code to be indicated directly on the goods and cannot be processed/treated in a predetermined manner by classifying and conveying it on the manufacture line one by one. When the fluid is to be filled within a packaging container, however, "processing/treatment after packaging" is possible. Thus, it is possible to manufacture, package and handle the goods by indicating the manufacturing instructing data code and the handling instructing data code together on the package as one single data code.

(c) Conventionally, a number of types of products such as paints have been produced by first producing a predetermined component per product type as a master batch and then filling it into individual packaging containers. Recently, however, there has been introduced a method of supplying empty packaging containers on a manufacture line one after another, filling predetermined components into the individual packaging containers and mixing them therein to produce the fluid component and the fluid component packaged goods at the same time. The adoption of this method allows the merit of the above item (b) to be actively utilized. (First Aspect of the Invention)

In order to solve the above-mentioned problems, according to a first aspect of the invention, there is provided a method for manufacturing/handling fluid component packaged goods comprising the steps of manufacturing fluid components of at least two types having different compositions; manufacturing fluid component packaged goods of at least two types in which the fluid components are filled in packaging containers; and handling the fluid component packaged goods differently according to their types or classification. The method further comprises the following conditions 1) through 4):

1) The fluid components of at least two types and the fluid component packaged goods of at least two types are manufactured concurrently by filling the predetermined components corresponding to the types or classification of the fluid components to and by implementing other necessary processes on individual packaging containers supplied one after another on one and the same manufacturing line.
2) The fluid component packaged goods manufactured on the manufacturing line are handled in a predetermined manner corresponding to its types or classification on a handling line.
3) A manufacturing/handling instructing data code containing processing information required for manufacturing the fluid components and handling information required for handling the fluid component packaged goods is indicated on the individual packaging containers in advance or in a pre-step of the manufacturing line.
4) Required processes based on the processing information of the data code are decided and executed in processing stations for manufacturing the fluid components and the fluid component packaged goods on the manufacturing line, and required handling based on the handling information of the data code are decided and executed in handling stations for handling the fluid component packaged goods on the handling line.

According to a second aspect of the invention, there is provided the method for manufacturing/handling the fluid component packaged goods, wherein the fluid component is paint and the fluid component packaged goods are paint goods filled in paint cans.

According to a third aspect of the invention, there is provided the method for manufacturing/handling the fluid component packaged goods, wherein the data code is a bar code or a two-dimensional code printed or pasted on the paint cans.

According to a fourth aspect of the invention, there is provided the method for manufacturing/handling the fluid component packaged goods, wherein the processes on the manufacturing line are at least processes for filling the predetermined components into the paint cans and mixing the paint cans, and the process on the handling line is at least a process for classifying and conveying the paint goods contained in the cans to predetermined shipping yards.

According to a fifth aspect of the invention, there is provided a manufacturing/handling instructing data code which is a data code to be affixed to a package of fluid component packaged goods and which contains at least a manufacturing instructing data to be utilized in manufacturing fluid components and a handling instructing data to be utilized in handling fluid component packaged goods.

According to a sixth aspect of the invention, there is provided fluid component packaged goods, in which the manufacturing/handling instructing data code in the fifth aspect of the invention is affixed on packaging containers thereof.

According to a seventh aspect of the invention, there is provided a manufacturing/handling instructing data code which is a data code to be affixed to a paint can goods to be filled with paint and which contains at least a manufacturing instructing data to be utilized in manufacturing the paint and a handling instructing data to be utilized in handling the paint can goods filled with the paint.

According to an eighth aspect of the invention, there is provided paint goods contained in cans, in which the manufacturing/handling instructing data code in the seventh aspect of the invention is affixed to the paint cans.

Individual packaging containers for manufacturing fluid components of at least two types having different compositions are supplied one after another on one and the same manufacturing line at first in the method for manufacturing/handling the fluid component packaged goods.

The multi-type goods are manufactured continuously on one and the same manufacturing line by undergoing the process for filling predetermined components to these packaging containers according to the classification of the fluid components and other required processes, e.g., a process for mixing the fluid components. Thus, it becomes possible to provide the unique multi-product type concurrent manufacturing method of manufacturing the fluid components of two or more types and of completing the manufacturing of the packaged goods at the same time, unlike the normal processes for solid goods.

The variety of fluid component packaged goods produced out of the manufacturing line are then handled, for example, classified and sent to a predetermined shipping yard (or a stock yard) decided per type of the products.

In such manufacturing/handling cycle of the fluid component packaged goods, the manufacturing/handling instructing data code containing the processing information required for manufacturing the fluid components and the handling information required for handling the fluid component packaged goods is indicated on the individual packaging containers in advance or in the pre-step of the manufacturing line by pasting labels or by printing.

Accordingly, the processing and handling operations in each station may be decided and executed by reading the manufacturing process information within the manufacturing/handling instructing data code in the processing stations for manufacturing the fluid components and the handling information within the manufacturing/handling instructing data code in the stations for handling the fluid component packaged goods mechanically by using code readers or the like. Thus, it becomes possible to automate the whole manufacturing/handling cycle of the fluid component packaged goods.

The merit pointed out in (b) in the section of notified points described above may be realized by combining the method of supplying the empty packaging containers on which the manufacturing/handling instructing data code is indicated to the manufacturing line with the method of carrying out the processes such as filling the predetermined fluid components into these individual containers, mixing them, and the like. That is, when the fluid components are contained within the packaging container, it is possible to implement "processing/treatment after packaging" such as mixing the components, and the like so that it becomes possible to manufacture, package and handle the goods by indicating one data code containing both the manufacturing instructing data code and handling instructing data code on the package.

As a result, it becomes unnecessary to indicate the two types of data codes of manufacturing instructing data code and handling instructing data code to the objects of two types of the product and the package in the separate steps for one packaged goods like the prior art. Accordingly, because a check system for assuring the two types of data codes to correspond infallibly with each other is not required, the data code pasting process and a data information processing system using a computer and other may be remarkably simplified.

The above-mentioned operations and effects may be achieved preferably when the fluid component is paint or other liquid components and when the fluid component packaged goods are paint goods filled in paint cans or other can containers. The above-mentioned operations and effects may be achieved preferably when the manufacturing/ handling instructing data code is a bar code or a two-dimensional code printed or pasted on the packaging container such as a paint can.

The above and other advantages of the invention will become more apparent in the following description and the accompanying drawing.

Figure 1:
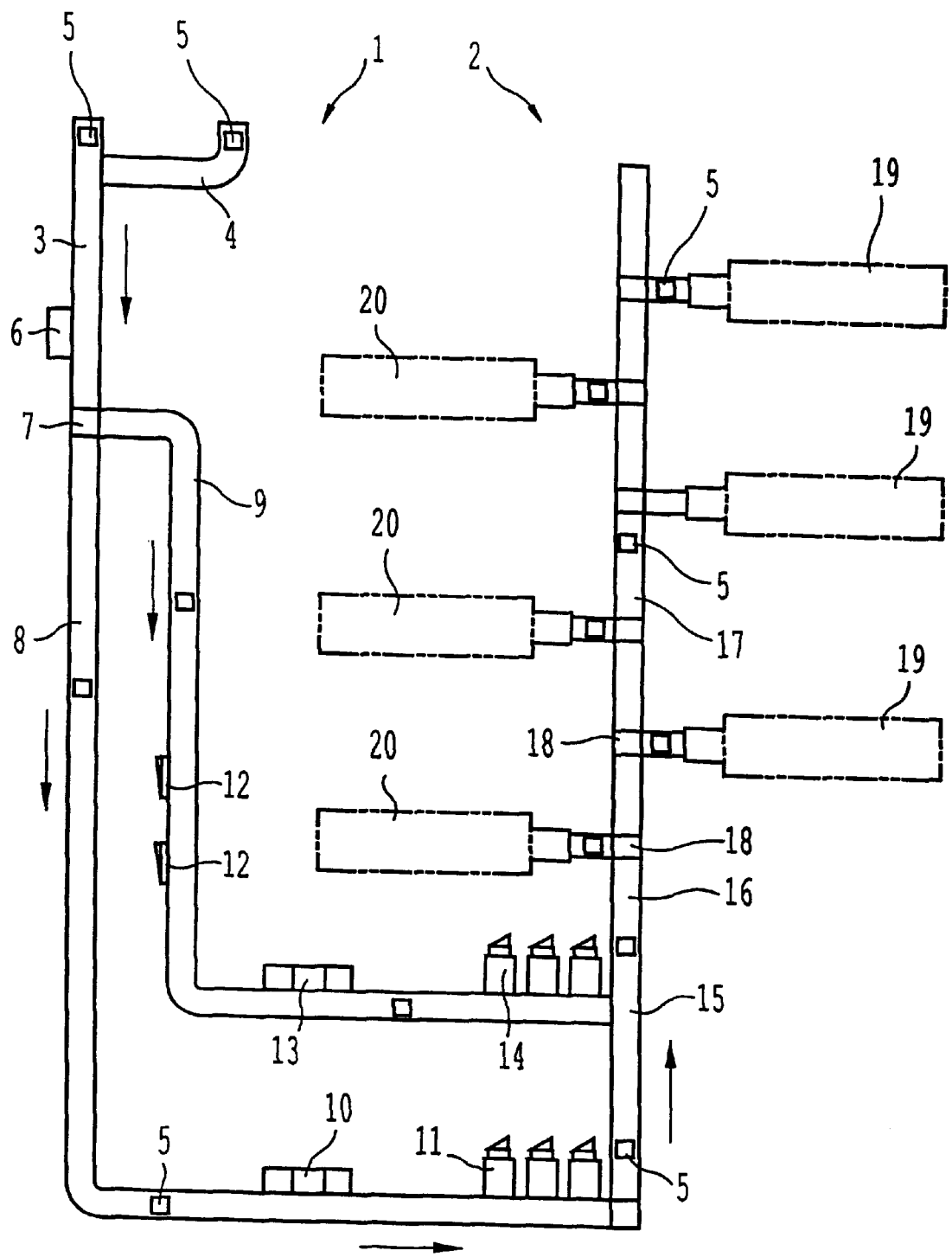
FIG. 1 is a diagram conceptually showing a system of a preferred embodiment of the invention.

DESCRIPTION OF THE PREFERRED EMBODIMENT (Fluid Component)

The present invention does not limit the type of fluid component and is applicable to liquid phase, particulate phase and gaseous phase components having a fluid state or semi-fluid state. The fluid component may be also one composed of only single phase material among them or composed of mixture of two or more phases of such materials such as solid suspension. The one composed of only single phase material described above includes emulsion for example. The invention is suited for liquid components or paint components in particular among them.

Fluid components of two or more types having different contents of composition may be produced by the invention. The differences of the contents of composition include the difference of all kinds of contents of composition distinguishable as fluid component goods (for example, filling amounts and color tones of the fluid component, grades of material, whether or not aggregate is added, whether or not thickener, water repellent or fungicide is added and the like), beside the case when the type of the component is different and the ratio of the components is different.

(Step of Manufacturing Two or More Kinds of Fluid Components)

While two or more kinds of fluid components are produced by filling predetermined components in predetermined amounts on a manufacturing line in principle, one which has been already prepared may be used for part of the components like the case of completing the basic composition of paint separately in advance and of producing paints of two or more kinds having different colors by mixing pigments having predetermined color tones therewith in a predetermined amount on the manufacturing line.

While the fluid component manufacture step includes at least a process of filling the predetermined components into a packaging container, it is possible to include other processes. Such processes include mixing the filled components and checking the quality of the fluid component provided that it may be automatically processed based on the manufacturing instructing data code.

(Step of Manufacturing Two or More Kinds of Fluid Component Packaged Goods)

Because the above-mentioned step of manufacturing the two or more kinds of fluid components also becomes the step of manufacturing two or more kinds of fluid component packaged goods, the both steps are completed basically at the same time.

More strictly speaking, a process for sealing the package such as a capping step for capping a filling port is included in this step because the packaging container of the fluid component has at least the filling port for filling the fluid component. This package sealing process may be carried out arbitrarily at required timing. For example, when the fluid component mixing step is carried out by inserting agitating means to the packaging container from the filling port, the package sealing process is carried out after the mixing step. When the fluid component mixing process is to be carried out by holding and swinging or rotating the whole packaging container, the package sealing process is carried out before the mixing step.

The shape and material of the packaging container are not limited specifically in the invention. However, because the manufacture/handling instructing data code is indicated on the packaging container, a soft and flexible bag is not preferable as the packaging container since it is not easy to indicate and to read the data code reliably by a code reader. A preferable container is a packaging container which is made of a rigid material such as metal and plastic and which has a flat surface so that the data code may be indicated readily at a region where it can be read readily by the code reader. A cubic or rectangular parallelepiped metallic paint can which is used often as a paint packaging container is an example suited most as a container.

(Step for Handling Two or More Kinds of Fluid Component Packaging Goods)

The fluid component packaged goods produced one after another in the above-mentioned steps are handled next in a predetermined manner corresponding to the type of the goods in a handling line. While the contents of the handling are not specifically limited, the typical one is to specify the name of a consignee and a carrier and to classify and convey the goods to a shipping or stock yard corresponding to that. Beside that, the handling contents include those operations of placing the goods at a specific position of the shipping or stock yard, managing a number of stocks, collecting a plurality of goods, and packaging a plurality of goods in a batch.

It is also possible to include the handling instructing data effective for automating certain handling works of handling and storing in/taking the packaged goods out of a warehouse in the data code described above by expanding the concept of the "handling works" of the fluid component packaged goods under the cooperation of shipping agents or of users at the destinations.

(Manufacturing/Handling Instructing Data Code)

Preferably, the manufacturing/handling instructing data code is a so-called bar code or more preferably, is a two-dimensional code which allows a larger amount of information to be set. It may be of a type of setting information by punching through a card in a predetermined mode for example. In short, it will do if it can be read mechanically by a reader such as a code reader and can be processed or handled automatically in a processing station or a handling station through information processing via computers.

Although the mode for indicating the manufacturing/ handling instructing data code on the packaging container is not limited, preferably, the manufacturing/handling instructing data code is printed directly on the packaging container or a label on which the manufacturing/handling instructing data code is indicated is pasted on the packaging container. The region on the packaging container where the label is pasted is not limited and the region where the manufacturing/handling instructing data code can be read readily and reliably by the reader may be adequately selected. In case of a paint can for example, it becomes easy to design a manufacturing line including the disposition of the code reader in many cases by pasting the label on the flat portion of the upper surface (top board of the can). It causes no problem even when a cylindrical paint can is used. The label may be pasted on the side or bottom of the can as a matter of course.

The manufacturing/handling instructing data code may be also indicated in advance on the packaging container to be supplied to the manufacturing line or a label issuing and pasting unit may be installed at the pre-step of the fluid component manufacture step in the manufacturing line to paste a predetermined kinds/number of manufacturing/handling instructing data codes on the packaging containers one after another as scheduled. Because the manufacture/handling works of the fluid component packaged goods are decided by the type and the number of issued labels in those cases, the operation of the whole manufacture/handling lines of the factory is controlled automatically by the labels. Accordingly, it is possible to construct a manufacturing system for managing a manufacturing plan of a day or a week by the type and the number of issued labels.

At least, manufacturing instructing data to be utilized in producing the fluid component and handling instructing data to be utilized in handling the fluid component packaged goods are included as the contents of information of the manufacturing/handling instructing data code.

However, in the manufacturing or handling line of multi-type fluid components and of fluid component packaged goods, there is also a step which is processed more conveniently by processing manually rather than automatically. Accordingly, the effect of the invention may be assured when at least one process in the manufacturing step and one process in the handling step (the process for deciding and executing the type and the amount of component to be filled in the fluid component manufacturing process and the process of deciding and executing the classification of goods in the fluid component packaged goods handing step for example) are automated and all processing/handling works other than those need not be always automated.

Therefore, data for instructing one process in the manufacturing step and data instructing one process in the handling step (data instructing the type and the amount of component to be filled or manufacturing instructing data of the other type in the fluid component manufacturing step and data instructing the classification of the goods or handling instructing data of the other type in the fluid component packaged goods handing step for example) just need to be included in the manufacturing instructing data and the handling instructing data.

It is noted that the utilization of the manual works is effective particularly in receiving an order and in shipping the goods on the day. It becomes easy to limit shipping time on that day (moving up the time or adjusting to collecting time of a truck on a route) or to change the production plan when an order is canceled on that day.

The manufacturing/handling instructing data code may be structured so as to contain all data required for instructing the manufacturing and handling works to be automated to be able to directly instruct processing and handling works in the processing or handling station. It may be also structured so as to contain only identification data (ID code or the like) indicating the type of the goods to be able to take out necessary manufacturing and handling instructing data from a memory of a host computer based on that.

EMBODIMENT

Next, one embodiment of the invention will be explained based on FIG. 1 which shows an exemplary system of the method for manufacturing/handling the fluid component packaged goods.

The system of the present embodiment is a system for concurrently and continuously producing multi-type paints contained in paint cans. The types of the paints are classified roughly into paint containing predetermined aggregate and paint not containing it. Paints having a predetermined plurality of color tones are produced by adding pigments of respective colors to the both types of the paints (there is a case when no pigment is added).

The system shown in FIG. 1 comprises a manufacturing line 1 for preparing paint components to be contained in a can and a handling line 2 for classifying and conveying them. Whether these manufacturing and handling lines should be composed of a singular line or a plurality of lines may be arbitrarily changed.

The manufacturing line 1 starts from two paint can supplying paths 3 and 4 composed of a conveyer and others capable of conveying the goods in the direction of arrows in the figure. Paint cans 5 supplied to the paint can supplying path 3 are empty cans in which the paint containing no aggregate is scheduled to be produced. Paint cans 5 supplied to the pain can supplying path 4 are filled with blank base paint (whose basic composition is completed in advance and whose composition as the paint is completed by filling pigment) in which predetermined aggregate has been added.

Then, a labeler 6 pastes labels not shown on which the manufacturing/handling instructing data code having predetermined information contents is indicated on the paint cans 5 conveyed through the two paint can supplying paths 3 and 4. At this time, whether the paint can 5 is the empty can or the can filled with the blank base paint is discriminated adequately by manual or automatic means.

The manufacturing/handling instructing data code contains information on whether it is the aggregate added paint or not and on the processes of filling the base paint, adding the pigments and mixing the components as the manufacturing instructing data, and information on the classification of goods per type, names of consignees and shipping agents as the handling instructing data. The manufacturing/handling instructing data code may include the identification code of the manufacturing instructing data and the identification code of the handling instructing data so as to collate to a computer about the manufacturing instructing data and the handling instructing data.

It is noted that while the paint can supplying path has been divided into two lines due to the manufacturing situation and the convenience of the line design, those paint can supplying paths 3 and 4 may be unified as the circumstances permit.

The paint cans 5 on which the label of the manufacturing/handling instructing data code has been pasted by the labeler 6 are divided and sent either to a first processing line 8 in which the aggregate added paint is produced or a second processing line 9 in which the aggregate-less paint is produced as the respective data codes are read at a line selecting section 7. That is, the paint cans 5 in which the aggregate added blank base paint has been filled are sent to the first processing line 8 and the paint cans 5 which are empty cans are sent to the second processing line 9, respectively.

Pigments of predetermined colors are filled into the aggregate added blank base paint which has been already filled in the paint cans 5 sent to the first processing line 8 by a predetermined amount as the information of the manufacturing/handling instructing data code is read by mechanical means such as a code reader not shown in a filling station 10 for filling pigments. Then, their filling ports are sealed by caps by a cap closing unit not shown and they are sent to an agitating station 11 to undergo a mixing process so that the paint components are agitated and mixed homogeneously.

A large number of agitating units are installed along the line because the agitating station 11 requires a longer processing time as compared to the other steps. While this agitating unit holds the sealed paint can 5 having rectangular parallelepiped shape by a clamp to shake, agitate and mix the contents homogeneously, another agitating unit having another scheme may be adopted.

Meanwhile, because the paint cans 5 sent to the second processing line 9 are empty cans, they are sent to a filling station 12 for filling blank base paint at first. Here, the information of the manufacturing/handling instructing data code is read by mechanical mean s such as a code reader not shown to fill the blank base paint having a predetermined composition in a predetermined amount. Then, they are sent to a filling station 13 for filling the pigments, which is constructed in the same manner as the filling station 10, and to an agitating station 14 which is constructed also in the same manner as the agitating station 11 via the work for sealing the cap of the filling port by the cap closing unit constructed in the same manner as that described to undergo the agitating and mixing step. There is a case when the paint cans 5 do not undergo the mixing step in the agitating station 14 depending on the type of the paint cans 5 (when the blank base paint is filled and no aggregate nor pigment is added for example).

While the first processing line 8 and the second processing line 9 are divided intentionally as the lines for the paint cans 5 of the aggregate added paint and for the paint cans 5 of the aggregate-less paint by taking the manufacturing efficiency and others into account, it is of course possible to unify those lines into one line having the base paint filling station, a pigment filling station and an agitating station, so long as the manufacturing/handling instructing data code is utilized.

The paint cans 5 of the aggregate added paint which have undergone the steps of the first processing line 8 and the paint cans 5 of the aggregate-less paint are conveyed to the next handling line 2.

In the handling line 2, the paint cans 5 from the first processing line 8 are conveyed on a conveyer path 15 and the cans 5 from the second processing line 9 are conveyed on a conveyer path 16 (the conveyer path 15 and the conveyer path 16 may be unified) to be sent to a classifying line 17.

A classifying point 18 for shipping/stocking a required number of goods is provided in the classifying line 17 to read the handling instructing data of the manufacturing/handling data of the paint cans 5 sent one after another by mechanical means such as a code reader to transfer only the corresponding paint cans 5 prescribed at the classifying point 18 to corresponding shipping pallet 19 or a stocking pallet 20 and to pass the other paint cans 5 as they are to send them to the next classifying point 18.

As described above, the system of the present embodiment allows a large number of and a great variety of paints to be manufactured continuously and efficiently while being contained in the packaging containers and the classification thereof and the classification of the pallets per each shipping/stocking destination to be carried out automatically without causing failures.

While the preferred embodiment has been described, variations thereto will occur to those skilled in the art within the scope of the present inventive concepts which are delineated by the following claims.

What is claimed is:

1. A method for manufacturing/handling fluid component packaged goods, said method comprising the steps of:

manufacturing fluid components of at least two types having different compositions;

manufacturing fluid component packaged goods of at least two types in which said fluid components are filled into packaging containers; and handling said fluid component packaged goods differently according to the types thereof;

wherein said fluid components and said fluid component packaged goods are manufactured concurrently by supplying packaging containers one after another on one and the same manufacturing line and filling predetermined components corresponding to the types of the fluid components into the containers;

said fluid component packaged goods manufactured on said manufacturing line are handled in a predetermined manner corresponding to the types thereof on a handling line;

a manufacturing/handling instructing data code is structured so as to contain all data for instructing manufacturing and handling works to be automated to directly instruct the manufacturing and handling works in processing and handling stations, and said data code is indicated on each of said packaging containers in advance or in a pre-step of said manufacturing line; and required processes based on processing information of said data code are decided and executed in the processing stations for manufacturing said fluid components on said manufacturing line, and required processes based on handling information of said data code are decided and executed in the handling stations for handling said fluid component packaged goods on said handling line.

2. The method according to claim 1, wherein said fluid components are paints and said fluid component packaged goods are paint goods filled into paint cans.

3. The method according to claim 2, wherein said data code is a bar code or a two-dimensional code printed or pasted on the paint cans.

4. The method according to claim 3, wherein the processes on said manufacturing line comprise filling the predetermined components into the paint cans and mixing the paint cans and the processes on said handling line comprise classifying the paint goods contained in the cans and conveying the paint goods to predetermined shipping yards.

5. The method according to claim 3, wherein said data code is printed or pasted on a flat portion of the upper surface of the paint can.

6. A method for manufacturing/handling fluid component packaged goods, said method comprising the steps of:

issuing a predetermined kinds/number of labels indicating manufacturing/handling instruction data codes for manufacturing/handling fluid component packaged goods of at least two types having different compositions, in accordance with a manufacturing plan of a day or a week;

pasting said labels on individual packaging containers supplied one after another on a manufacturing line; and manufacturing fluid components and handling fluid component packaged goods in the individual packaging containers with said labels, based on information of the manufacturing/handling instruction data codes indicated on said labels, so that the operation of the whole manufacturing/handling lines of the fluid component packaged good is automatically controlled in accordance with the manufacturing plan of a day or a week by the type and number of said issued labels.

* * * * *